United States Patent

[11] 3,603,823

| [72] | Inventor | Elmer B. Mason<br>901 Vickie Dr., Oklahoma City, Okla.<br>23115 |
|------|----------|---|
| [21] | Appl. No. | 883,526 |
| [22] | Filed | Dec. 9, 1969 |
| [45] | Patented | Sept. 7, 1971 |

[54] MAGNETIC MOTOR WITH PLURALITY OF STATORS
2 Claims, 11 Drawing Figs.

[52] U.S. Cl. .................................................. 310/46, 310/67, 310/112, 310/128, 310/231
[51] Int. Cl. .................................................. H02k 23/36
[50] Field of Search .......................................... 310/46, 67, 112, 114, 125, 126, 266, 128, 231, 219

[56] References Cited
UNITED STATES PATENTS

| 1,545,422 | 7/1925 | Graichen ...................... | 310/231 |
| 2,194,211 | 3/1940 | Sansom ........................ | 310/46 X |
| 3,471,728 | 10/1969 | Noble ........................... | 310/231 X |
| 3,534,203 | 10/1970 | Sommeria .................... | 310/46 X |
| 153,456 | 7/1874 | Paine ........................... | 310/46 |
| 1,764,714 | 6/1930 | Boykow ........................ | 310/67 X |
| 1,934,766 | 11/1933 | Krussmann .................... | 310/112 |
| 2,273,840 | 2/1942 | Dever ........................... | 310/67 |
| 3,308,318 | 3/1967 | Dunaiski et al. ............... | 310/67 X |
| 3,396,296 | 8/1968 | Esters ........................... | 310/46 X |

*Primary Examiner*—D. F. Duggan
*Attorney*—Robert K. Rhea

ABSTRACT: An electric motor frame is defined by spaced-apart generally circular end members which coaxially journal a rotor comprising a drive shaft having a disklike flange secured thereto medially the spacing of the end members. Stator coils are concentrically secured to the inner surface of at least one end plate and field coils are secured to at least one side surface of the rotor in concentric outwardly spaced relation with respect to the stator coils. Brush rigging, connected with the rotor, supports a pair of brushes interposed between a commutator and slip rings concentrically surrounding the drive shaft and supported by one frame end member to complete a current switching action to the stator coils.

ELMER B. MASON
INVENTOR.

BY
Robert K. Rhea
AGENT

ELMER B. MASON
INVENTOR.

BY
Robert K. Rhea
AGENT

ELMER B. MASON
INVENTOR.

BY
Robert K. Rhea
AGENT

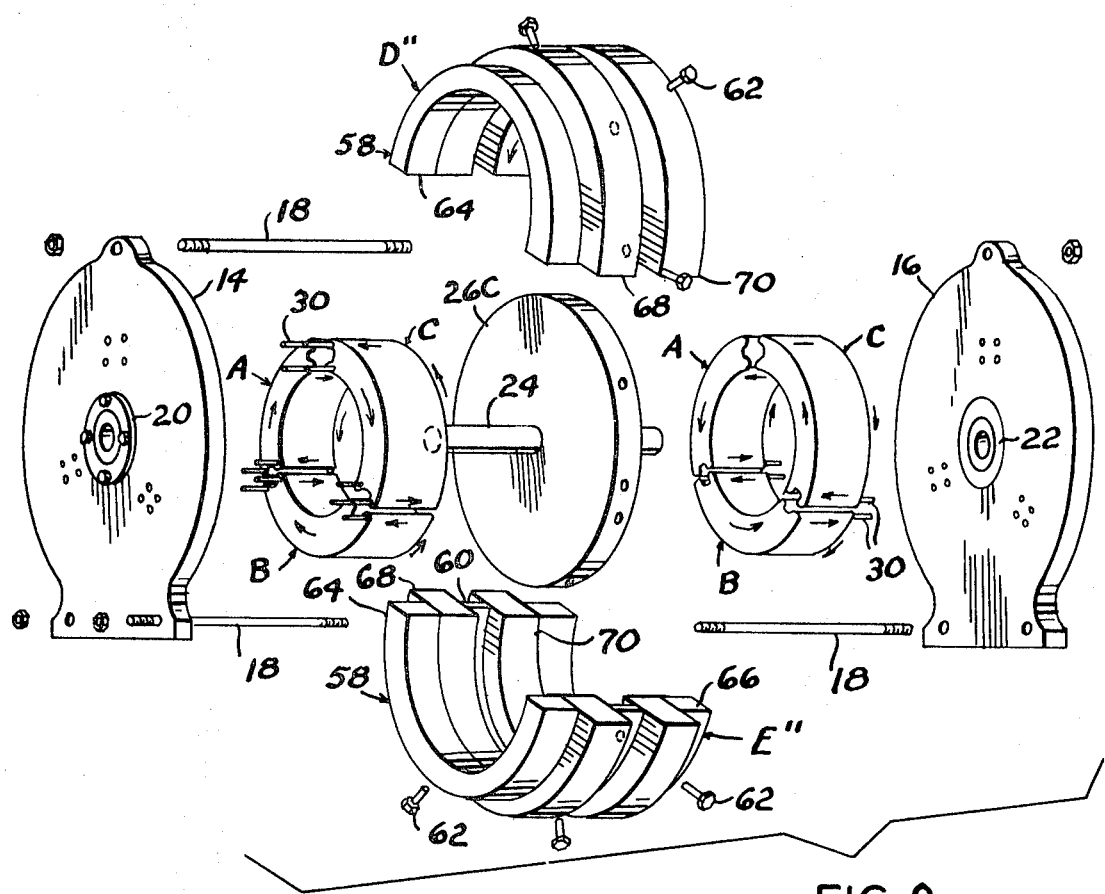
FIG. 9
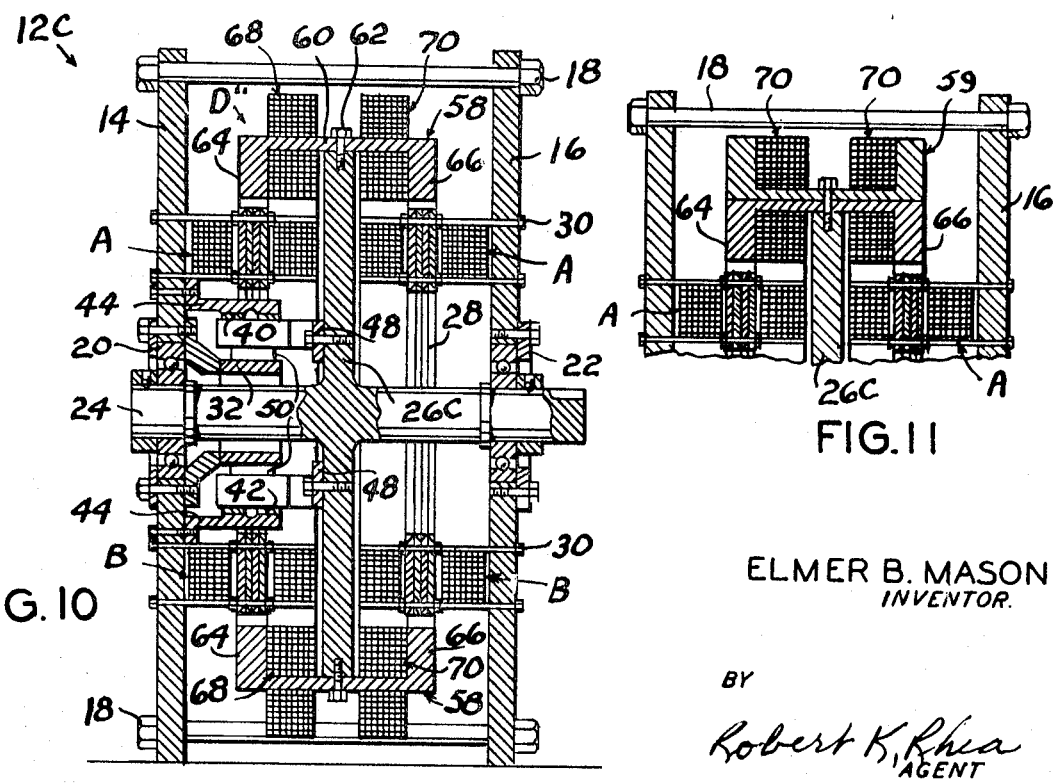
FIG. 10
FIG. 11
ELMER B. MASON
INVENTOR.
BY
Robert K. Rhea
AGENT

MAGNETIC MOTOR WITH PLURALITY OF STATORS

BACKGROUND OF THE INVENTION

1. Field of the Invention

The present invention relates to electric motors and more particularly to single and multistage concentric motors having stator coils spaced inwardly of rotating field coils for increasing the torque of the drive shaft.

Conventional electric motors comprise a generally circular frame which journals a drive shaft. The frame supports stators or field windings, either permanent or electromagnets, while the drive shaft supports an armature formed by winding a plurality of coils thereon concentrically disposed within the stators or field coils. Brushes, supported by brush rigging connected with the frame, contact a commutator formed on one end of the armature control the direction of current through the coils. Conventional electric motors thus utilize the armature as a rotating switch and power source.

In this invention positioning the armature coils or windings concentrically outward of the drive shaft, fixing their position to form stator coils and mounting the field coils or magnets outwardly of the stator coils for rotation therearound, increases the torque on the drive shaft by a leverage factor which increases for each increment of radially outward spacing, from the drive shaft, of the stators and rotating field coils.

2. Description of the Prior Art

U.S. Pat. Nos. 294,043; 2,550,571 and 3,069,577 relate to axial gap squirrel cage type motors.

The principal distinction between this invention and the prior art patents resides in the structural arrangement of fixedly connecting the armature coils and a commutator to the motor housing and securing the field magnets or coils to a rotor so that the fields are disposed in concentric rotating relation outwardly of the armature coils. Furthermore, this invention utilizes more of the magnet flux field by a plurality of concentric stagging of stators and rotating field coils for increasing the torque on the drive shaft.

SUMMARY OF THE INVENTION

A motor frame comprising generally circular spaced-apart platelike end members which horizontally journal a drive shaft having a disklike flange forming a rotor medially the frame ends. A plurality of iron core stator coils are concentrically secured to the inner surface of at least one end plate in radially outwardly spaced relation with respect to the drive shaft. A pair of iron core field coils is concentrically secured to a cooperating face of the rotor for rotation of the field coils around the stators. An additional stage or stages comprising other fixed stator coils and rotating field coils may be concentrically added as desired and permitted by the physical size of the motor. Brush holders, connected with the rotor, support a pair of brushes in contact with a commutator concentrically surrounding the drive shaft and connected with a frame end member while slip rings, surrounding the brush holders and supported by the frame end member, connect a source of electrical energy to the field coils and successively energize the stator coils in a switching action for generating magnetic flux fields and driving the rotor.

The principal object of this invention is to provide an electric motor having a concentric rotor-stator coil configuration having a high efficiency rating and a higher torque on its drive shaft than conventional motors.

BRIEF DESCRIPTION OF THE DRAWINGS

FIG. 9 is an exploded perspective view of another embodiment of the motor;
FIG. 10 is a vertical cross-sectional view, partially in elevation, of FIG. 9 when assembled; and,
FIG. 11 is a fragmentary vertical cross-sectional view of an alternative embodiment of the motor illustrated in FIG. 10.

DESCRIPTION OF THE PREFERRED EMBODIMENTS

Figure 1:
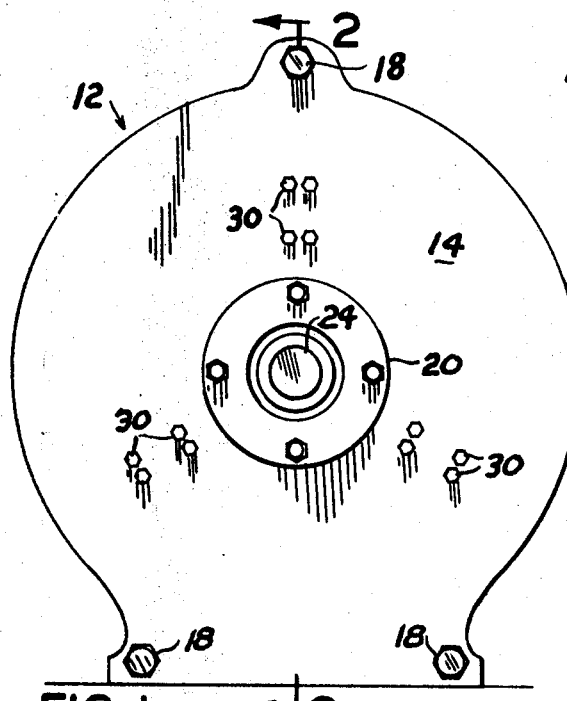
FIG. 1 is an end elevational view of the motor.

Like characters of reference designate like parts in those FIGURES of the drawings in which they occur.

Figure 4:
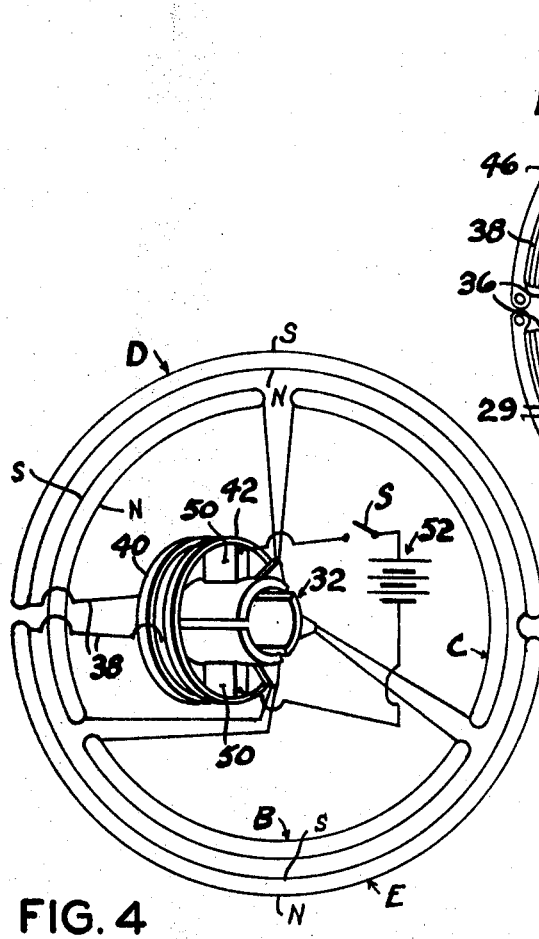
FIG. 4 is a wiring diagram of the left hand half of the motor as viewed in FIG. 2.
Figure 3:
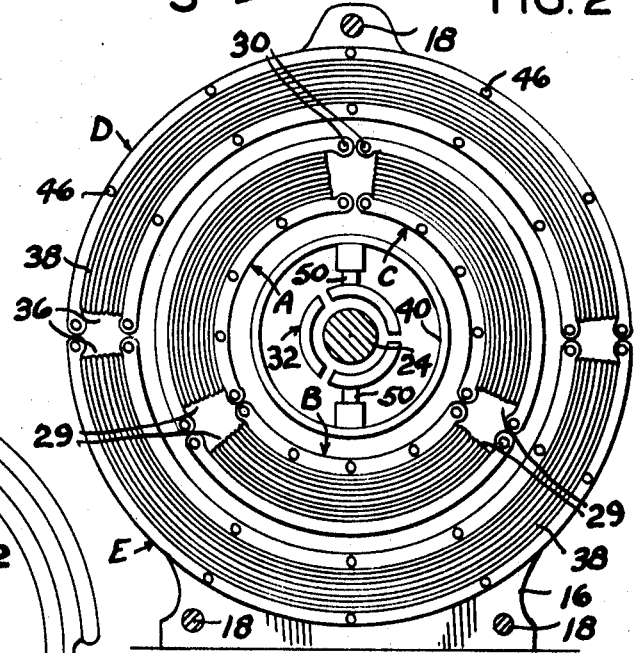
FIG. 3 is a vertical cross-sectional view, partially in elevation, taken substantially along the line 3—3 of FIG. 2.

In the drawings:

Referring more particularly to FIGS. 1 to 4, the reference numeral 12 indicates a DC motor which is cylindrical in general configuration comprising a pair of generally circular end plates 14 and 16 connected in parallel spaced relation by a plurality of bolts 18. The end plates 14 and 16 are centrally apertured for respectively receiving bearings 20 and 22 which journal an axle or drive shaft 24 having shoulders 25 adjacent each of its ends and having an integral disklike flange intermediate its ends of less diameter than the end plates forming a rotor 26. Two sets, each comprising a series, three in the example shown, of armature magnets or coils A, B and C, each coil describing an arc of a circle, are disposed in a circular array and connected respectively to the inner surface of the end plates 14 and 16 concentric with respect to the axle 24. Each of the coils A, B and C are substantially identical and are formed by multilayers, four in the example shown, of soft iron core or coil plates 28 arranged edgewise in the circular plane, within the respective coil, and in contiguous face to face contact. The respective end portions of the assembled coil plates are transversely notched or cut away to form a wire receiving and supporting recess 29. The coil plates 28 are secured to the respective end plates 14 and 16, intermediate the spacing between the end plates and the adjacent side surface of the rotor 26, by bolts 30. Each of the coils A, B and C further includes a length of wire which is wound around the lateral sides of the coil plates 28, prior to their connection with the end plates, as a continuous length of wire extending along both sides of the assembled coil plates 28 and through the recesses 29 formed at respective ends thereof thus forming magnetic coils. Each end of the wires forming the coils A, B and C is connected, respectively, with adjacent segments of a three segment commutator 32 concentrically supported, in spaced relation, around the axle 24 by and electrically insulated from the bearing 20. These stator coils A, B and C, when energized, as hereinafter explained, each form a north pole N at one side and a south pole S at its opposite side (FIG. 4).

Two sets, each comprising a pair of field coil windings D and E, with each coil defining a substantially semicircular arc, are mounted, respectively, on opposite sides of an outer peripheral portion of the rotor 26 in concentric spaced relation with respect to the two sets of stator coils A, B and C for rotation therearound. Each of the field coils D and E comprise a similar plurality of soft iron core or coil plates 34 and 35, respectively, each having similar recesses 36 at their ends, respectively defining a socket for nesting a wire 38 wound laterally around the respective coil plates in a similar manner with respect to the stator coils with the exception that the wire 38, after being wound around the coil plates 34 to form the coil D, is extended or continued for winding around the coil plates 35 to form the coil E thus joining the coils D and E in series. Each end of the wire 38 is connected, respectively, to a pair of slip rings 40 and 42 concentrically surrounding, in spaced relation, the axle 24 and commutator 32 and supported by brackets 44 connected with the inner surface of the end plate 14. A plurality of bolts 46 extend transversely through the respective sets of coil plates 34 and 35 and the rotor 26 for mounting the sets or pairs of coils D and E thereon.

A brush rack assembly 48 is interposed between the commutator 32 and slip rings 40 and 42 and is adjustably connected with the rotor 26 for supporting a pair of commutator brushes 50. A battery 52 has its terminals connected respectively to the brushes 50 for energizing the sets of stator coils A, B and C and sets of field coils D and E when a switch S, interposed in the positive battery cable, is closed. The direction of winding of the stator coils A, B and C and the armature coils D and E results in the magnet flux attraction and repulsion between the stators and the field coils being equal and opposite to each other so that there is no resultant end thrust of a material magnitude operating on the rotor. Placing the armature windings D and E radially outward of the stator coils takes advantage of the flywheel effect and adds to the torque on the axle or shaft 24 by reason of the leverage advantage obtained by the radially outward spacing of the rotating sets of field coils D and E.

Figure 6:
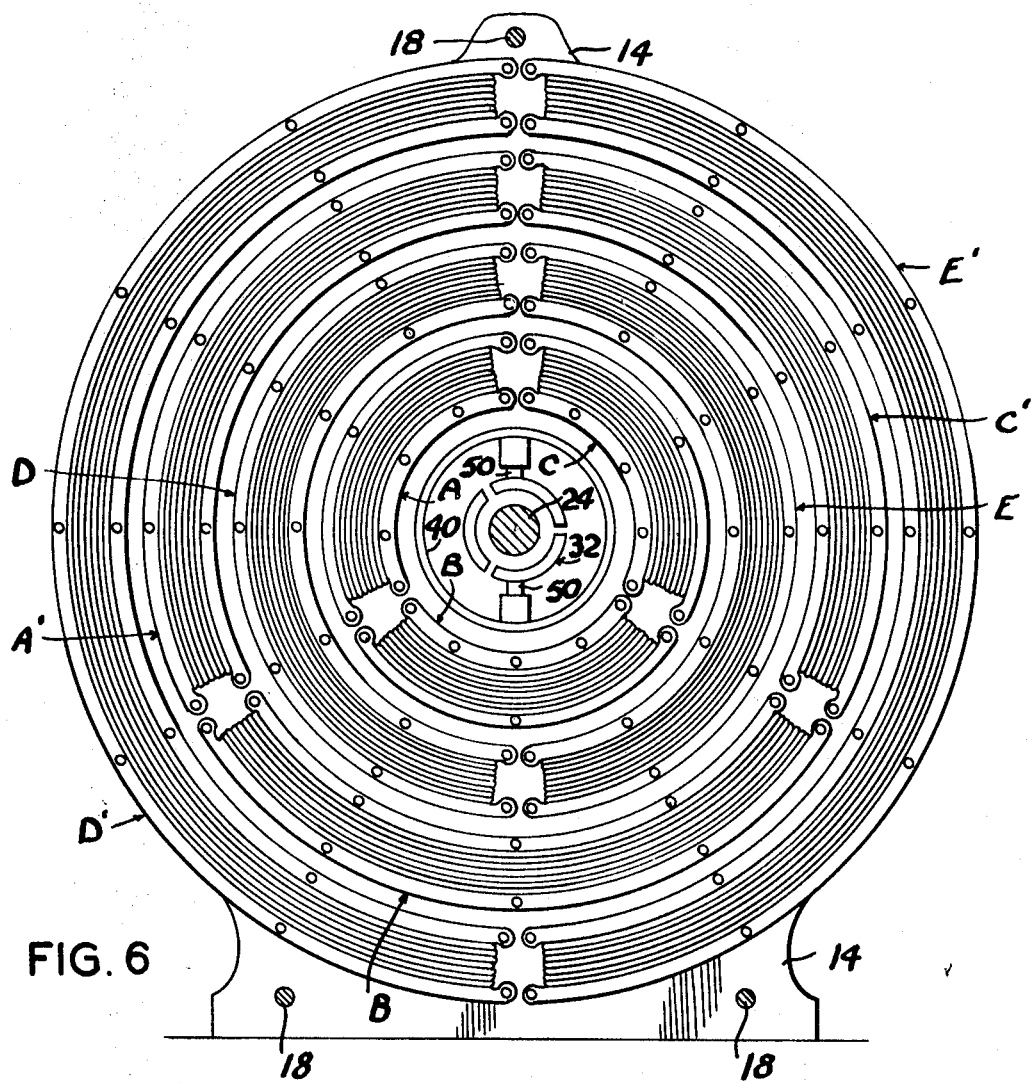
FIG. 6 is a vertical cross-sectional view, partially in elevation, taken substantially along the line 6—6 of FIG. 5.
Figure 5:
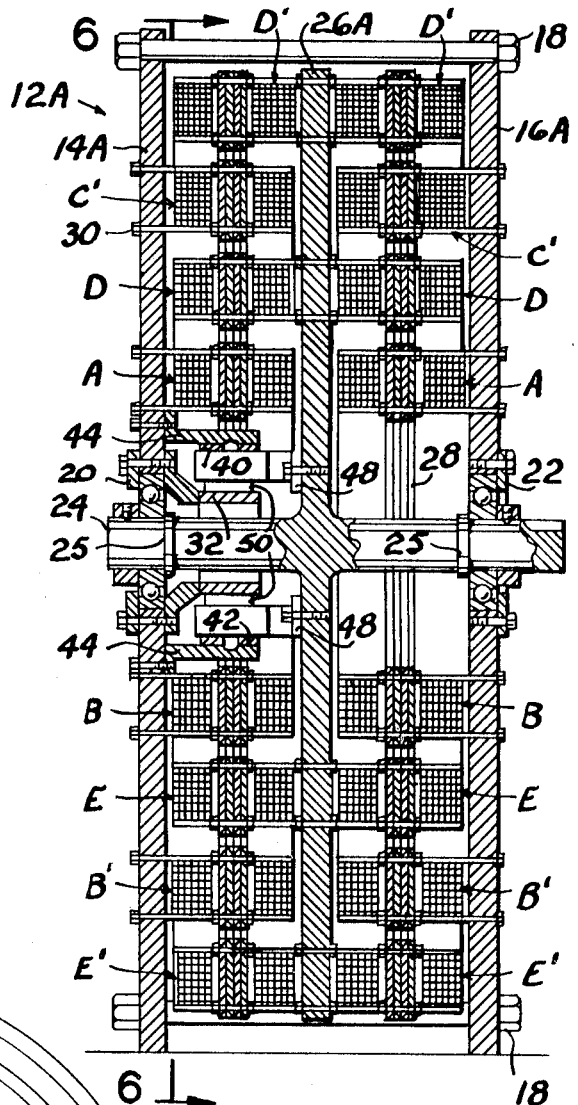
FIG. 5 is a view similar to FIG. 2 of a dual stage embodiment of the motor.
Figure 7:
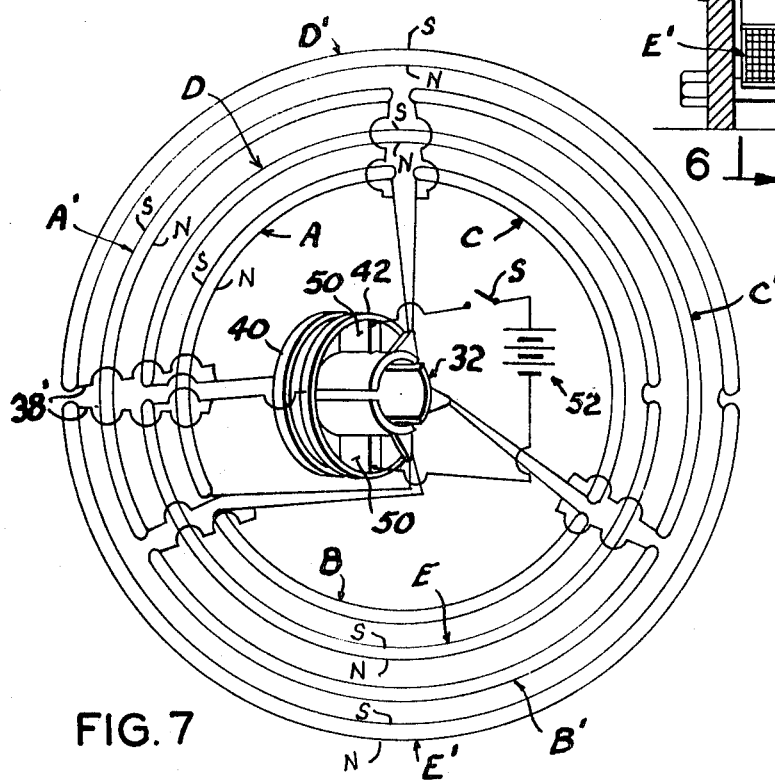
FIG. 7 is a wiring diagram of the left hand half of the motor as viewed in FIG. 5.

Referring now more particularly to FIGS. 5, 6 and 7, a modified form of the motor is illustrated at 12A which is substantially a diametrically greater sized version of the motor 12 comprising end plates 14A and 16A similarly journaling an axle or drive shaft 24A having an enlarged rotor 26A integrally joined therewith. The motor 12A includes the two sets of stator coils A, B and C and field coils D and E. Two additional sets each comprising three stator coils A', B' and C' are similarly constructed and connected with the inner surface of the respective end plates 14A and 16A in concentric radially outward close spaced relation with respect to the two sets or pairs of field coils D and E. Similarly two other sets, each comprising a pair of field coils D' and E', are similarly formed and connected with opposing sides of the outer peripheral limit of the rotor 26A concentric with the respective set of stator coils A', B' and C'.

As shown in FIG. 7, the ends of the wires forming the stator coils A', B' and C' are connected to the wires or leads from the inner circular array of the stators A, B and C in turn connected with the commutator 32. Similarly the wire 38', forming outer field coils D' and E', connect these coils in series and each end of this wire is connected respectively to the leads of the field coils D and E in turn connected with the slip rings 40 and 42.

The battery 52 similarly applies current to the stator coils and field coils when the switch S is closed. The principal advantage of the motor 12A over the motor 12 is that it utilizes the normally unused magnetic flux field extending radially outwardly from the field coils D and E. The further radial outward spacing of the additional stator and field coils, with respect to the axle 24A, increases the leverage factor and the torque applied to the axle. The motor 12A might be termed a concentric twin motor.

Figure 2:
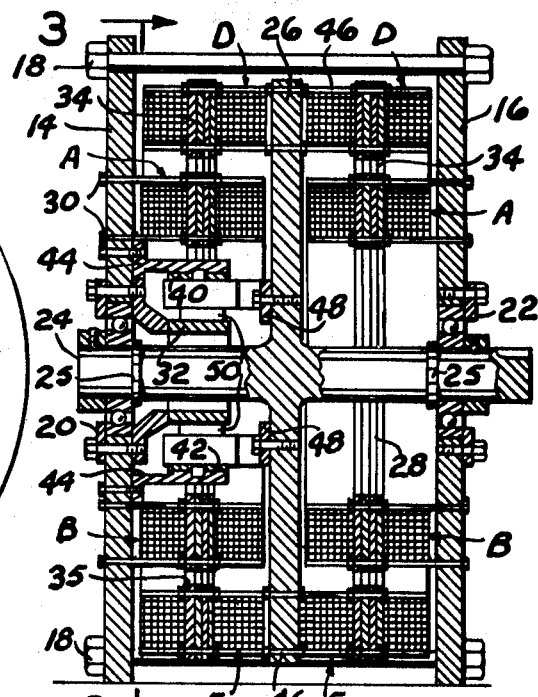
FIG. 2 is a vertical cross-sectional view, partially in elevation, taken substantially along the line 2—2 of FIG. 1.
Figure 8:
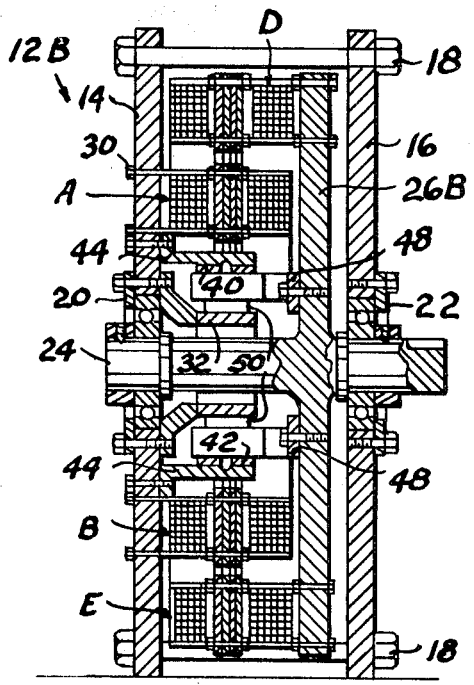
FIG. 8 is a view similar to FIG. 2 of an alternative embodiment of the motor.

Referring now to FIG. 8, the numeral 12B illustrates another embodiment of the motor comprising substantially one-half the configuration of FIG. 2 which includes the end plates 14 and 16 journaling a shortened version of the axle, as indicated at 24B, having an integral flange 26B forming the rotor. In this embodiment only one set of the stator coils A, B and C, only coils A and B being shown, are mounted on the inner surface of the end plate 14. One pair of the field coils D and E are similarly connected to one side of the rotor 26B in concentric spaced relation with respect to the stator coils A, B and C. The wires forming the stator coils A, B and C and field coils D and E are similarly connected to the battery 52 through the switch S, brushes 50, slip rings 40 and 42 and commutator 32.

Referring now to FIGS. 9 and 10, another embodiment of the motor is illustrated at 12C which is substantially identical to the motor 12 with the exception of its field coils. The motor 12C includes the end plates 14 and 16 journaling the axle 24 by bearings 20 and 22 with a motor flange 26C integrally connected with the axle. Two sets of the stator field coils A, B and C are similarly concentrically connected with the inner surfaces of the respective end plates 14 and 16. The field coils, indicated at D" and E", comprise a pair of substantially semicircular members 58, U-shaped in cross section and having a bight portion 60 contiguously contacting the outer peripheral surface of the rotor flange 26C and secured thereto by bolts 62 so that the respective leg portions 64 and 66 of the U-shaped members 58 project toward, in circumferential spaced relation, the respective iron coil plates 28 of the sets of stator coils A, B and C. The field coils D" and E" further include coil windings 68 and 70 which are respectively formed by winding a wire longitudinally around the respective U-shaped member from end to end along the outer surface of the respective U-shaped member and in the spacing between the respective leg 64 and 66 and the adjacent surface of the rotor flange 26C so that the inner limit of the windings forming the field coils D" and E" is radially spaced outwardly of that portion of the respective stator coils A, B and C disposed adjacent the respective side surfaces of the rotor flange 26C. The windings of the stator coils A, B and C on one side of the rotor are identical whereas the stator coils A, B and C on the opposite side of the rotor are wound in reverse or cross wired in order to match polarity of the field coils D" and E". As viewed in FIG. 10, the leg 64 of the field coil D" will be a north pole while its other leg 66 is a south pole. The leg 64 of the field coil E" becomes a south pole and its other leg 66 is a north pole. The wires forming the sets of stator coils A, B and C and field coils D" and E" are similarly connected to the battery through the switch S, brushes 50, slip rings 40 and 42 and commutator 32.

Referring now to FIG. 11, a modified version of the field coils D" and E" is illustrated, only D" being shown, which is similarly constructed with respect to the coil D" with the exception that a second substantially semicircular U-shaped member 59 is added and connected by its bight portion to the outwardly directed surfaces of the bight portion of the U-shaped member 58. The purpose of the additional U-shaped member is to increase the magnetic flux field acting on the stator coils A, B and C.

OPERATION

The operation of the various embodiments is substantially identical.

Referring, by way of example, to the diagram of FIG. 4, when the switch S is closed, current is applied to the stator coil A by contact of the brushes 50 with the two segments of the commutator 32 connected with the wire forming the coil A. Energizing coil A results in forming north and south poles S and N, as indicated. Simultaneously the current is applied to the windings of the field coils D and E forming north and south poles, as indicated. Thus, the north pole N of the field coil D is attracted to the south pole S of the stator coil A resulting in rotation of the field coil D toward the left, as viewed in FIG. 4, so that the coil D seeks to be centered over the stator coil A. This rotation results in the movement of the brushes 50, secured to the rotor, around the commutator 32 which results in energizing the stator coil B and forming opposite poles between the stator coil B and approaching field coil D to continue the rotation. The stator coil C is similarly energized in turn. The efficiency of the motor may be further increased by the addition of another commutator, or by wiper brushes, neither being shown, so that at least two of the stator coils would be energized thus increasing the torque applied to the drive shaft.

Obviously the invention is susceptible to changes or alterations without defeating its practicability, therefore, I do not wish to be confined to the preferred embodiment shown in the drawings and described herein.

I claim:

1. A direct current electric motor, comprising:
   a pair of end plates connected in parallel spaced relation;
   a shaft extending between and journaled by said plates;

a rotor comprising a disk coaxially secured to said shaft between said plates for rotation with said shaft;

a plurality of stator units respectively connected concentrically with said plates, each said stator unit comprising a plurality of elongated arcuate magnetic flux producing coils each extending longitudinally through an arc of a circle and being arranged to substantially describe a circle on the face of the respective said end plate adjacent the rotor and in radially outward spaced relation with respect to said shaft;

a like plurality of field assemblies concentrically connected with respective opposing sides of said disk outwardly of the respective said stator unit, each said field assembly comprising a plurality of elongated longitudinally arcuate curved magnetic flux producing coils, said stator units and said field assemblies each having a substantially radially disposed magnetic field axis;

commutating means comprising a segmented commutation ring secured to one said end plate in concentric spaced relation with respect to said shaft, a pair of slip rings supported by said one end plate in concentric spaced relation around said commutation ring, and brush rigging connected with the face of said disk adjacent said commutation ring, said brush rigging including a pair of brushes slidably contacting said commutation ring and said slip rings; and, wiring connecting a source of direct current with the coils of said field assemblies through said slip rings and connecting the direct current with the coils of said stator units through the segments of said commutation ring.

2. The electric motor according to claim 1 in which the magnetic flux producing coils of said stator units and said field assemblies extends transversely through the spacing between respective opposing side surfaces of said rotor and the respective inner surface of said plates, said coils each forming north and south magnetic poles medially their ends at radially opposite sides thereof.